US008336917B2

(12) United States Patent
Doiron

(10) Patent No.: US 8,336,917 B2
(45) Date of Patent: Dec. 25, 2012

(54) COLOR CODED ANATOMICAL AND NON-ANATOMICAL STICKER LABELS TO BE USED ON MEDICATION BOTTLES TO IDENTIFY WHAT MEDICATION IS USED FOR AND WHEN MEDICATION IS DUE TO BE ADMINISTERED

(76) Inventor: Whitney Doiron, Edwards, MS (US)

( * ) Notice: Subject to any disclaimer, the term of this patent is extended or adjusted under 35 U.S.C. 154(b) by 248 days.

(21) Appl. No.: 12/662,454

(22) Filed: Apr. 19, 2010

(65) Prior Publication Data

US 2011/0133444 A1 Jun. 9, 2011

Related U.S. Application Data

(60) Provisional application No. 61/267,544, filed on Dec. 8, 2009.

(51) Int. Cl.
*G09B 19/22* (2006.01)
*B42D 15/00* (2006.01)
*G09F 3/00* (2006.01)

(52) U.S. Cl. ........... 283/115; 283/48.1; 283/70; 283/81; 283/900; 40/310

(58) Field of Classification Search .................... 283/67, 283/70, 81, 48.1, 115, 900; 40/310
See application file for complete search history.

(56) References Cited

U.S. PATENT DOCUMENTS

| | | | | |
|---|---|---|---|---|
| 3,880,311 A | | 4/1975 | McPhee | 215/7 |
| 4,039,080 A | | 8/1977 | Cappuccilli | 206/534 |
| 4,389,963 A | | 6/1983 | Pearson | 116/308 |
| 4,476,381 A | | 10/1984 | Rubin | 235/375 |
| 4,573,580 A | | 3/1986 | Messer | 206/534 |
| 4,815,767 A | * | 3/1989 | Lambert | 283/67 |
| 4,883,180 A | | 11/1989 | Humphrey et al. | 206/534 |
| 4,941,688 A | | 7/1990 | Jones | 283/72 |
| 5,031,937 A | | 7/1991 | Nellhaus | 283/52.1 |
| 5,064,071 A | | 11/1991 | Kerfoot, Jr. | 206/534 |
| 5,102,169 A | * | 4/1992 | Mayfield | 283/115 |
| 5,193,032 A | | 3/1993 | Hirth | 359/804 |
| 5,261,702 A | * | 11/1993 | Mayfield | 283/115 |
| 5,431,450 A | | 7/1995 | Coleman | 283/62 |
| 5,605,000 A | | 2/1997 | Scott | 40/107 |
| 5,758,096 A | * | 5/1998 | Barsky et al. | 283/115 |
| 5,852,590 A | | 12/1998 | de la Huerga | 368/10 |
| 5,992,890 A | * | 11/1999 | Simcox | 283/900 |
| 5,995,938 A | * | 11/1999 | Whaley | 705/3 |
| 6,135,507 A | | 10/2000 | Hamby et al. | 283/81 |
| 6,227,371 B1 | | 5/2001 | Song | 206/534 |
| 6,449,927 B2 | | 9/2002 | Hebron et al. | 53/501 |
| 6,769,545 B1 | | 8/2004 | Mallams | 206/534 |
| 6,985,870 B2 | | 1/2006 | Martucci et al. | 705/3 |
| 7,188,738 B2 | | 3/2007 | Stafford et al. | 211/72 |

(Continued)

*Primary Examiner* — Dana Ross
*Assistant Examiner* — Kyle Grabowski
(74) *Attorney, Agent, or Firm* — Jacobson Holman PLLC

(57) ABSTRACT

Current medication labels are very difficult for people with disabilities, language barriers, functional impairments, or illiteracy to read, potentially increasing the risk for accidental medication overdoses and/or poor compliance with medication administration and adherence. By having a color coded sticker system with an enclosed full body guide in the form of a poster, and a home health medication record card, these stickers are placed on each medication bottle as a symbol for what the medication is used for. The stickers are color coded in order to distinguish the time the medication is to be administered. Home health agencies may use the poster and stickers as they educate their patients about the medications they take.

12 Claims, 5 Drawing Sheets

U.S. PATENT DOCUMENTS

| | | | | |
|---|---|---|---|---|
| 7,311,205 | B2 | 12/2007 | Adler et al. | 206/534 |
| 7,320,483 | B2 * | 1/2008 | Eippert | 283/67 |
| 7,328,919 | B2 | 2/2008 | Weinstein | 283/67 |
| 7,926,850 | B1 * | 4/2011 | Muncy et al. | 283/70 |
| 7,961,555 | B2 * | 6/2011 | Holt | 283/115 |
| 2001/0054568 | A1 | 12/2001 | Weisbach | 206/534 |
| 2002/0162261 | A1 * | 11/2002 | West et al. | 40/638 |
| 2003/0025320 | A1 | 2/2003 | Shoemaker | 283/81 |
| 2003/0043026 | A1 | 3/2003 | Noble et al. | 340/309.15 |
| 2004/0069673 | A1 | 4/2004 | Dinges | 206/484 |
| 2005/0029156 | A1 | 2/2005 | Girzaitis | 206/570 |
| 2005/0121407 | A1 | 6/2005 | Hildebrandt | 215/228 |
| 2005/0126950 | A1 | 6/2005 | Kaufman | 206/534 |
| 2005/0182656 | A1 | 8/2005 | Morey | 705/2 |
| 2006/0070895 | A1 | 4/2006 | Khawaja | 206/223 |
| 2006/0078701 | A1 | 4/2006 | Glasier | 428/40.1 |
| 2006/0163869 | A1 | 7/2006 | Adler et al. | 283/81 |
| 2007/0029788 | A1 | 2/2007 | Adler | 283/81 |
| 2007/0043530 | A1 * | 2/2007 | O'Rourke | 702/177 |
| 2007/0095850 | A1 | 5/2007 | Meyer | 221/2 |
| 2007/0186452 | A1 | 8/2007 | Hirth | 40/310 |
| 2008/0010874 | A1 | 1/2008 | Londino | 40/310 |

* cited by examiner

COLOR CODED ANATOMICAL AND NON-ANATOMICAL STICKER LABELS TO BE USED ON MEDICATION BOTTLES TO IDENTIFY WHAT MEDICATION IS USED FOR AND WHEN MEDICATION IS DUE TO BE ADMINISTERED

This is a complete application which claims priority from, and the benefit of U.S. Provisional Patent Application Ser. No. 61/267,544, filed Dec. 8, 2009, hereby incorporated in its entirety by reference.

FIELD OF THE INVENTION

The present invention relates to color coded anatomical and non-anatomical sticker labels to be used in medication bottles to identify a use of a medication.

BACKGROUND OF THE INVENTION

Currently, medication labels do not have any reference explaining what the medication is used for except for the diagnosis (if written on the prescription by the provider). Research supports that this directly results in poorer health outcomes, especially for those patients who may be disabled, elderly, functionally impaired, non-English speaking or are illiterate.

Currently, medication labels are written in typed black ink. This assumes the user can read English, can see the print, and understands what the words mean. With a culture of increasing diversity, "English" may not be the primary language. A medication bottle is presently given to a non-English speaking user and it is expected that the person understands what he/she is taking and when it should be given. The same is true for the elderly who may be functionally impaired, persons with disabilities, or those who are illiterate.

SUMMARY OF THE INVENTION

The present invention provides a color coded, anatomical icon and non-anatomical icon sticker system that eliminates the problems of the prior art. The stickers are also color coded to identify what time of day the pill should be taken.

Within the kit of the present invention, a full body guide, in the form of a poster, identifies each sticker according to what part of the body the medication is used for or what part of the medical plan the medication is used for, i.e. "antibiotics". The stickers are kept simple, and do not contain any words. The stickers are only identified in English and Spanish on the poster guide. The present invention is meant to be a "visual" guide that can be utilized in any country or with any barrier.

The present invention is a single unit which includes: color coded anatomical and non-anatomical icon stickers, a full body guide in the form of a poster, a home health medication record card, and a blank medication reorder form. The parts may be separated and sold individually based on demand.

Once the kit of the present invention is purchased, the stickers, measuring 0.5×0.5 inches square at the most, are placed on the individual medication bottles (or cards) according to what the medication is used for. For visually impaired individuals, the stickers measure one inch by one inch.

For example, COREG is a heart medication that may be given up to three times daily. The stickers used would be three separate heart icon stickers, and each of the three stickers would be color coded a different color to indicate the time of the day the medicine should be taken.

The times of day are: "blue" for morning, "orange" for noon, "pink" for afternoon, "purple" for evening, "black" for bedtime, "brown" for weekly, "light blue" for monthly, "green" for as needed, and "red" for stop taking. These colors would be explained by appropriately graphic icons on the full body guide.

The different icon stickers represent:

(1) Head;
(2) Brain;
(3) Ear;
(4) Eye;
(5) Nose;
(6) Mouth;
(7) Neck;
(8) Bone;
(9) Arm;
(10) Hand;
(11) Chest;
(12) Back;
(13) Heart;
(14) Stomach;
(15) Kidneys;
(16) Leg;
(17) Foot;
(18) Skin;
(19) Pain;
(20) Depression/Anxiety;
(21) Sugar;
(22) Tremors;
(23) Memory;
(24) Male;
(25) Female;
(26) Antibiotic;
(27) Weight;
(28) Constipation;
(29) Blood Thinner;
(30) Sleep Deprivation;
(31) Vitamin; and
(32) Blank Stickers.

Each kit will have two sheets of three sets of different color coded icon stickers each, 300 stickers per sheet for a total of 600 stickers. The stickers are color coded according to time of day the medicine is to be taken. It is envisioned as being within the scope of the present invention that the sheets of stickers may be in booklet form, color coded per page, with a lesser number of stickers per sheet for a total of 600 stickers.

Since more medications may be used for the heart or bone for instance, additional stickers will be present on each sheet for that anatomical part than for stickers less frequently used, such as "weight". Blank and time period icon stickers are included and used at the discretion of the user (patient, home health nurse, caregiver, etc.).

A full body poster, no larger than 11×14 inches, is used as a guide when identifying what the stickers represent. For visually impaired individuals, the poster would measure 16×24 inches.

Both English and Spanish words identifying what the sticker represents will be written below each sticker on the poster only. The color key will be included on the poster identifying the time of the day the medication is to be taken.

A blank medication card will be included in the kit for the user to write down all of his/her medications once the medications are understood. The top of the card will identify the patient's name, allergies, physician name and number, emergency contact name and number, and pharmacy name and number, for example. The bottom of the card will have the name of the medication, space for the corresponding icon sticker, dosage and time for administration.

The elements of the kit include the color coded anatomical and non-anatomical stickers, a full body guide in the form of a poster, and a medication record card. An optional item would be a re-order form. A survey could be added for patient feedback to measure the effectiveness of the present invention.

The present invention is simple and straightforward. The stickers identified cover the main category for each medicine prescribed. The symbols created were designed to keep it simple. For example, "BONIVA" is an osteoporosis medication. The bottom line is it works on bones, so a "bone" sticker is used and the color light blue with a central "30", because it is taken monthly. It does not matter if the back is affected more or the hip, it is a "bone" medication.

Accordingly, it is an object of the present invention to provide a series of stickers in six different colors to indicate a time of day for taking a particular medication and the relevance of the medication to a particular body part or function as explained with reference to a poster chart.

It is another object of the present invention to provide a series of stickers in six different colors to indicate a time of day for taking a particular medication and the relevance of the medication to a particular body part or function as explained with reference to a poster chart, where a kit of the stickers and poster chart also includes a medication card to provide a reference for a particular medication, amount of medication, time of day for taking the medication and the applicability of the particular medication to a physical or mental functioning.

It is still yet another object of the present invention to provide a series of stickers in six different colors to indicate a time of day for taking a particular medication and the relevance of the medication to a particular body part or function as explained with reference to a poster chart, where a kit of the stickers and poster chart also includes a medication card to provide a reference for a particular medication, amount of medication, time of day for taking the medication and the applicability of the particular medication to a physical or mental functioning, with the stickers being used to label medication bottles to identify the use of the medication and the time of day of taking the medication, as well as the time period for taking the medication.

These and other objects of the invention, as well as many of the intended advantages thereof, will become more readily apparent when reference is made to the following description taken in conjunction with the accompanying drawings.

BRIEF DESCRIPTION OF THE DRAWINGS

The following drawings illustrate examples of various components of the invention disclosed herein, and are for illustrative purposes only. Other embodiments that are substantially similar can use other components that have a different appearance.

DETAILED DESCRIPTION OF THE PREFERRED EMBODIMENTS

Figure 1:
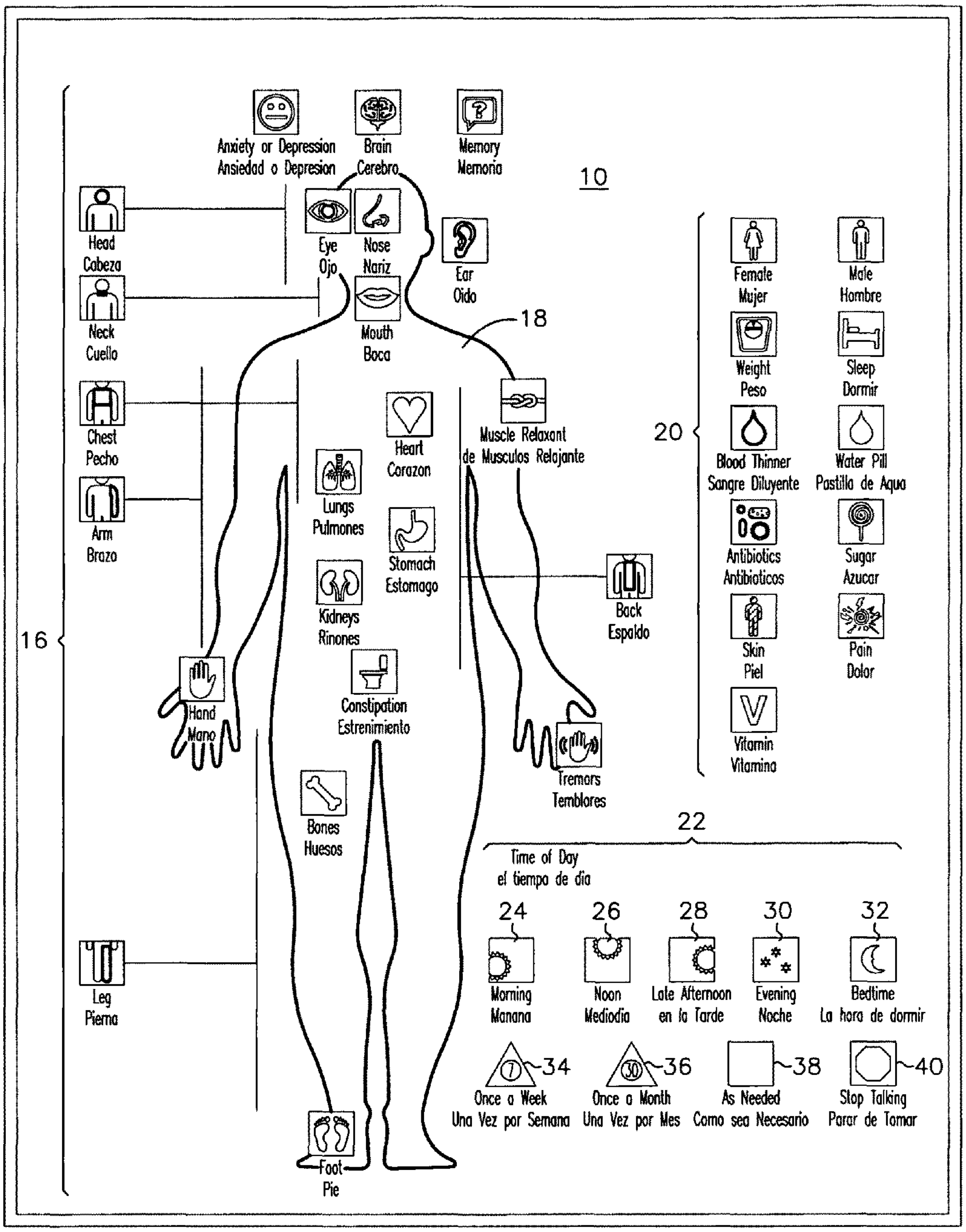
FIG. 1 is a poster chart of the kit of the present invention which is used as a reference guide to provide a label for treatment of a body part by use of a medication and frequency of use of the medication.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
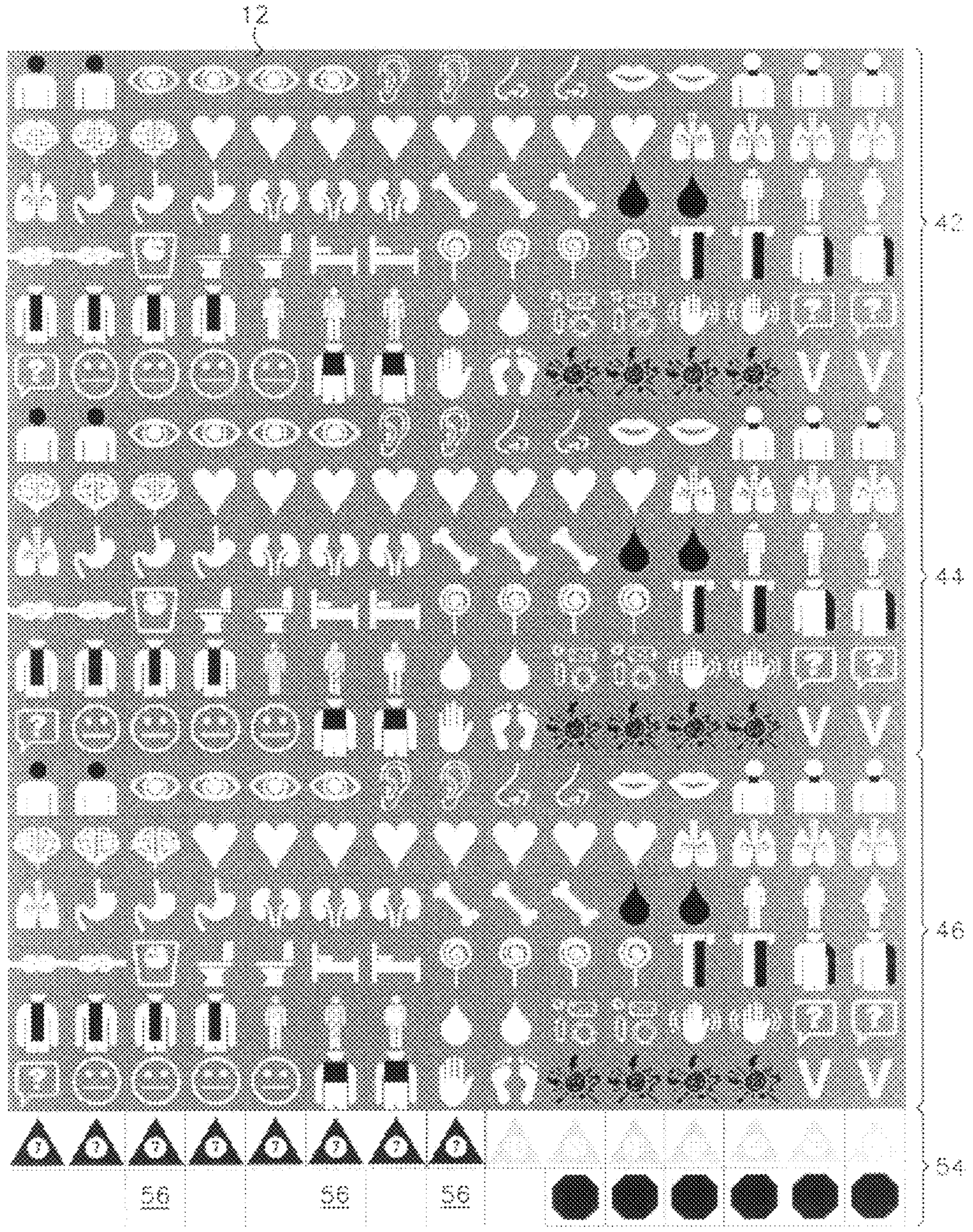
FIGS. 2 and 3 represent two sheets of icon stickers to be used in combination with the poster chart to identify the use of a medication, time of day of use of the medication and frequency of use of a medication.
Figure 3:
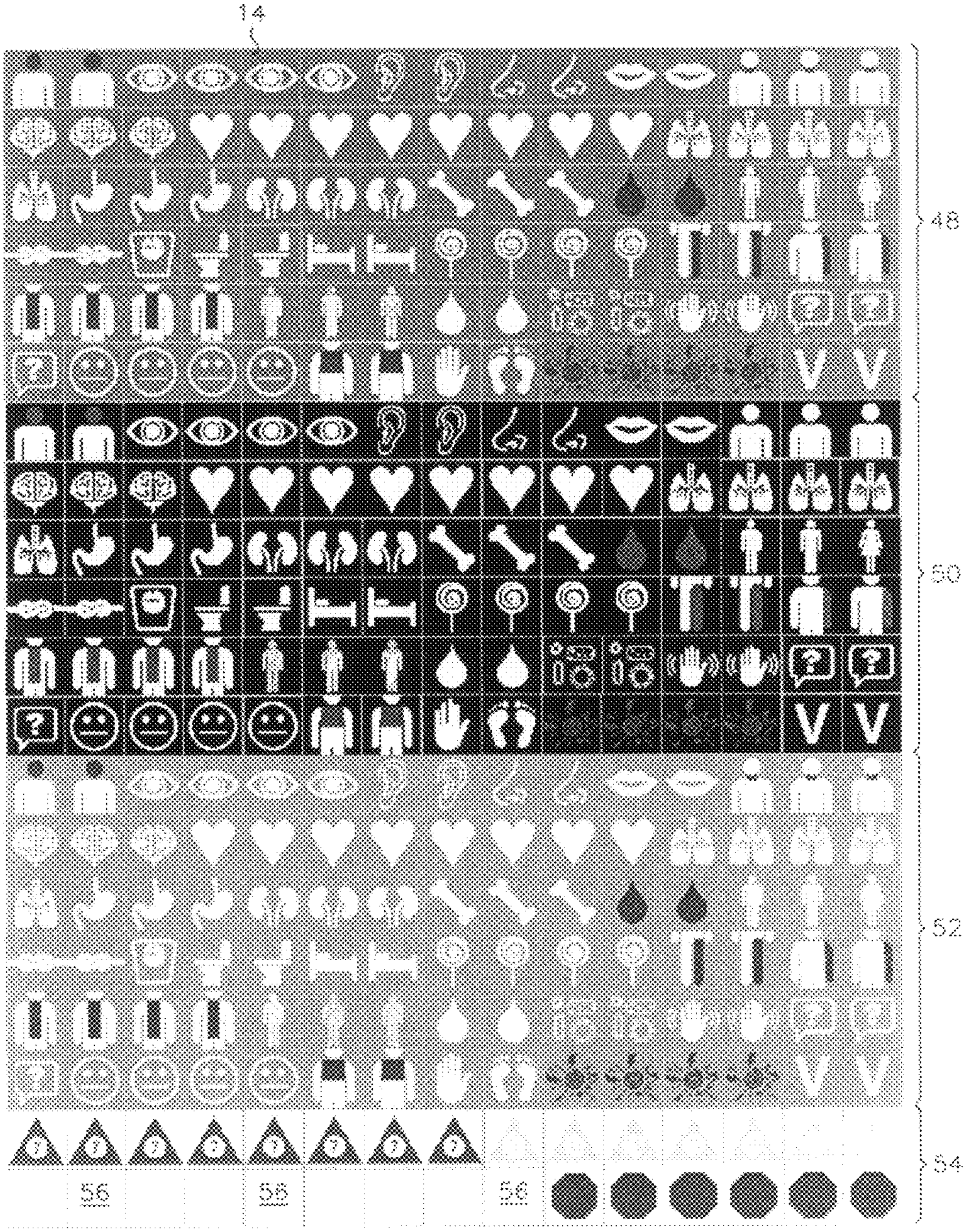
Figure 4:
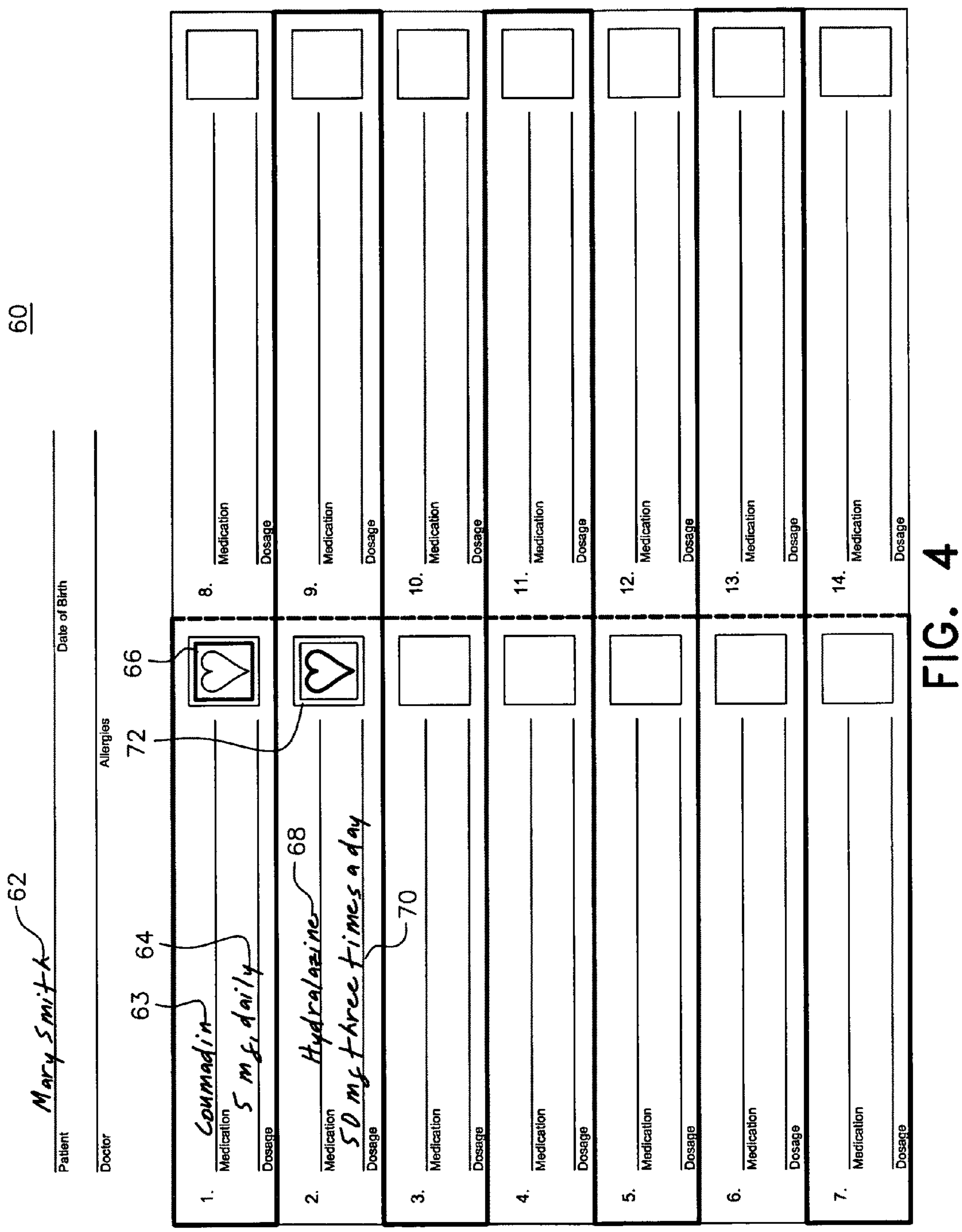
FIG. 4 illustrates a medication chart for keeping a record of a medication, the amount of the medication to be taken and the time period within which the medication is taken.

With reference to the drawings, in general, and to FIGS. 1 through 3 in particular, a medication identification system embodying the teachings of the subject invention includes a chart 10 and two sheets 12, 14 as shown in FIGS. 2 and 3, respectively. In FIG. 1, there are three groups of icons. The first group 16 includes a plurality of icons associated with an outline of a human body 18. Each of the icons include an image which is associated with a particular body part with the icon positioned on or proximate to a particular body part. By looking at the image on each of the stickers from sheets 12 and 14, it is automatically recognized to which body part the sticker is associated. A label for each sticker is printed on chart 10 below the icon in English and in Spanish.

The second group 20 of icons is used to associate a particular medical treatment for either a male or a female and by visualization of a particular icon, a particular malady is recognized associated with the human body. The third group 22 of icons identifies by the icon and its color, a particular time of day for taking of a particular medication. For example, sticker 24 is of a blue color indicative of morning. Sticker 26 is of orange color indicative of noon time. Sticker 28 is of pink color indicative of late afternoon. Sticker 30 is of purple color indicative of evening. Sticker 32 is black indicative of bedtime. In addition, brown sticker 34, with the number "7" centrally located on the sticker is indicative of a medication which should be taken once a week. Similarly, sticker 36 is of a light blue color and with the number "30" in the center of the sticker, is indicative of a medication which should be taken once a month. Sticker 38 is of a green color and is indicative of a medication which should be taken "as needed". Sticker 40 includes a red octagonal stop sign symbol and is indicative of a medication which should be discontinued.

On sheets 12, 14 as shown in FIGS. 2 and 3, there are six sets of stickers 42, 44, 46, 48, 50 and 52. Each group of stickers includes the stickers in group 16 and group 20 shown on the chart 10. However, each of the six groups of stickers is a different color.

Set 42 is blue and therefore identifies by the respective icons on the stickers the use of the medication and by the color, indicates that a particular medicine should be taken in the morning to treat the ailment associated with the icon. Set 44 is of orange color, set 46 is of pink color, set 48 is of purple color, set 50 is of black color and set 52 is of green color.

Therefore, by looking at the icon on each sticker, and the color of the sticker, the particular ailment to be treated by a medication is identified as well as the time of day that the medicine should be taken. The use of multiple stickers with the same icon would indicate the different times of day in which a particular medication should be taken.

Each sheet 12, 14 also includes a set of stickers 54 which includes the three remaining stickers 34, 36 and 40 from the chart 10. These stickers are used to indicate a medication that should be taken once a week or once a month or should be discontinued.

Set of stickers 52, since in green color, indicates that the medication to treat a particular ailment should be taken as needed. In addition, blank boxes 56 are for indicating an ailment or frequency of use of a medication not identified from the six sets of colored icons, and would be filled in by a caregiver or other health care professional to indicate a treatment not specifically covered.

To provide a record of the treatment regimen, medication card 60 is used to identify a patient's name 62 and other relevant information. In the example shown, the particular name of a medication 63 is indicated as well as the dosage and frequency of use 64. A sticker 66 including a heart icon is indicative of heart medication and its blue color indicates that the medication should be taken in the morning.

Similarly, a second medication 68 with its dosage and frequency of use 70 includes an associated sticker 72 indicative of heart medication and its black color indicative of taking at bedtime. The medication card 60 is for use by a caregiver to summarize a patient's medication. The stickers 66 and 72 do not necessarily represent the frequency of use on the medication card. The frequency of use and identification of the ailment being treated by the medication is used in combination with the medication bottles as shown in FIGS. 5 and 6.

Figure 5:
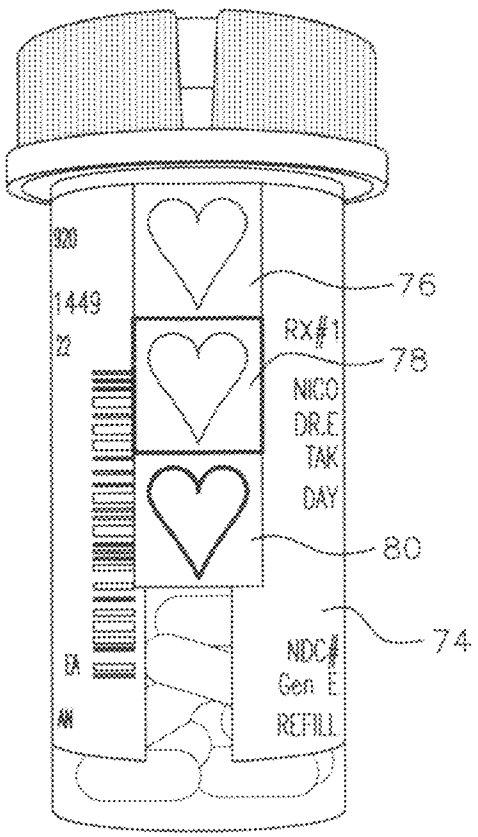
FIG. 5 illustrates a prescription bottle labeled with the appropriate icon stickers to advise an individual as to what the medication is used to treat and the frequency with which the medication should be taken.
Figure 6:
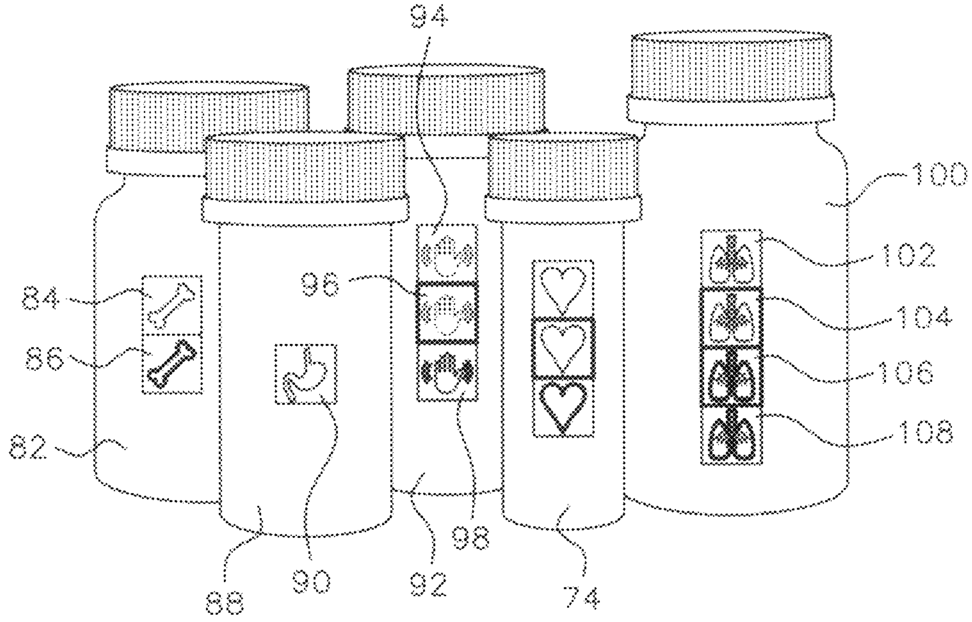
FIG. 6 illustrates five different bottles and the various icon stickers which are used on the bottles to identify a use of a medication and the frequency of use of the medication.

In FIG. 5, a bottle of prescription medicine 74 includes three stickers having a heart-shaped icon indicative of medication used for treating the heart. Sticker 76 is blue in color indicating that the medicine should be taken in the morning. Sticker 78 is orange in color indicating that the medication should be taken at noon. Sticker 80 is black in color indicating that the medication should be taken at bedtime.

Other examples of medication bottle labeling is provided by bottle 82 including medication for treating bones by sticker 84 of blue color indicating that the medication should be taken in the morning and sticker 86 of black color indicating that the medication should be taken at bedtime. Bottle 88 includes sticker 90 indicating that medication to treat the stomach is contained in the bottle and that the green color of sticker 90 means that the medication should be taken as needed. Bottle 92 includes stickers 94, 96 and 98. These stickers indicate that the medication is bottle 92 is used to treat tremors. Sticker 94 of blue color indicates that the medication should be taken in the morning. Sticker 96 of pink color indicates that the medication should be taken in the late afternoon. Sticker 98 of black color indicates that the medication should be taken at bedtime.

Bottle 100 includes stickers 102, 104, 106 and 108 with the icon indicative that the medication is used for treatment of the lungs and that, due to the blue, orange, purple and black colors of stickers 104 through 108, respectively, indicates that the medication should be taken in the morning, in the late afternoon, in the evening and at bedtime.

Accordingly, by the present invention, a simple system of identification of medication for treatment of a particular ailment or condition and the time of day at which the medication should be taken is provided without a need to identify the medication by writing or by a written indication of frequency of use. Quick reference to the chart 10 provides an indication of the ailment being treated and the frequency of use of a medication by colored icons and association to particular body parts which allows a patient to take the right medication at the right times.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A medication identification system comprising a plurality of sets of stickers, said stickers including icons identifying a particular body part or medical treatment, each of the sets of stickers being of a different color for identifying a particular time medication should be taken, a substrate having a chart identifying the icons of the sets of stickers and the chart including a key for the colors of the sets of stickers and with a graphical representation of a time of day for usage of the medication, the icons being located on an outline of a human body on the chart, with the icons on the chart being located proximate to a particular body part of the human body on the chart to demonstrate, in the absence of text, an association of a medicine and treatment of a medical condition, and a medication card for entering a name of a medication and having a marked border region designated for securing one of the stickers to the medication card indicative of the body part or the medical treatment associated with the medication and the particular time to take the medication.

2. The medication identification system of claim 1, wherein there are six different colors for six sets of stickers.

3. The medication identification system of claim 2, wherein the six different colors identify six different times for taking of a medication by reference to the chart and include the graphical representation of the time of day by icons of one of a sun, a moon and stars.

4. The medication identification system of claim 1, wherein the plurality of sets of stickers also include stickers identifying a frequency of use for a medication.

5. The medication identification system of claim 1, further comprising at least one bottle containing a medication and at least one sticker from at least one of the sets of stickers is secured to said at least one bottle and the at least one sticker identifies the use of the medication and time of use of the medication.

6. The medication identification system of claim 1, wherein the chart identifies the icons in English and Spanish.

7. A medication identification system comprising a plurality of sets of stickers, said stickers including icons identifying a particular body part or medical treatment, each of the sets of stickers being of a different color for identifying a particular time medication should be taken, a substrate having a chart identifying the icons of the sets of stickers by association with an outline of a human body, the icons indicating time of day and frequency of use of a medication and with a graphical representation of a time of day for usage of the medication, and the icons indicative of medication for a particular treatment by location of the icons proximate to a particular body part of the human body on the chart to demonstrate, in the absence of text, an association of a medicine and treatment of a medical condition, and a medication card for entering a name of a medication and having a marked border region designated for securing one of the stickers to the medication card indicative of the body part or the medical treatment associated with the medication and the particular time to take the medication.

8. The medication identification system of claim 7, wherein the icons indicating time of day are icons indicating one of morning, noon, late afternoon, evening and bedtime by the graphical representation of the time of day by icons of one of a sun, a moon and stars.

9. The medication identification system of claim 8, wherein the icons indicating medication for a particular treatment are icons indicating one of weight, sleep, blood thinner, water pill, antibiotics, sugar, skin, pain and vitamins.

10. The medication identification system of claim 7, wherein there are six different colors for six sets of stickers.

11. The medication identification system of claim 10, wherein the six different colors identify six different times for taking of a medication.

12. The medication identification system of claim 7, wherein the chart identifies the icons in English and Spanish.

* * * * *